United States Patent [19]

Otani

[11] Patent Number: 4,967,413

[45] Date of Patent: Oct. 30, 1990

[54] BURST SIGNAL DETECTION APPARATUS

[75] Inventor: Susumu Otani, Tokyo, Japan

[73] Assignee: NEC Corporation, Japan

[21] Appl. No.: 77,163

[22] Filed: Jul. 24, 1987

[30] Foreign Application Priority Data

Jul. 26, 1986 [JP] Japan .................. 61-176357

[51] Int. Cl.⁵ .................. H04B 1/10; H04L 1/20; H03M 13/00; H03M 13/12
[52] U.S. Cl. .................. 371/37.4; 371/37.7; 371/43; 375/102; 375/104
[58] Field of Search .................. 371/5, 37.1–37.7, 371/39, 40, 41, 42, 43, 44, 45, 46, 47; 375/114, 104, 102, 99; 370/100

[56] References Cited

U.S. PATENT DOCUMENTS 4,312,070  1/1982  Coombes et al. .................. 371/40
4,686,690  8/1987  Sato .................. 375/114

OTHER PUBLICATIONS

Product description of MC8506 Polynomial Generator by Motorola, Inc. (1983) 8 pages.
CCITT Recommendation X.25 (1980), 7 pages.
"SCPC/QPSK and SCPC/PCM/QPSK System Specification" Intelsat Earth Station Standards (IESS) Document IESS-303, pp. 1 to 61, especially FIGS. 6, published Jul. 1, 1985.

Primary Examiner—Jerry Smith
Assistant Examiner—Stephen M. Baker
Attorney, Agent, or Firm—Ostrolenk, Faber, Gerb & Soffen

[57] ABSTRACT

An apparatus for detecting burst signals used in satellite communication, for example, detects burst signals of the type comprising a unique word followed by a series of data. The burst signals are of the type that have undergone cyclic redundancy check (CRC) coding and error-correction coding. A unique word detector detects the unique word in the burst signal. An error-correcting decoder decodes the error-correction code used with the data. Two forms of error detection are used to reduce the possibility of erroneous data being mistakenly considered error-free. A cyclic redundancy check error detector detects any CRC error in the decoded data. A channel quality detector detects quality of the channel on which the burst signal is received. An output circuit provides an output signal indicating presence or absence of error in the data in response to outputs of the unique word detector, the CRC error detector, and the channel quality detector.

3 Claims, 5 Drawing Sheets

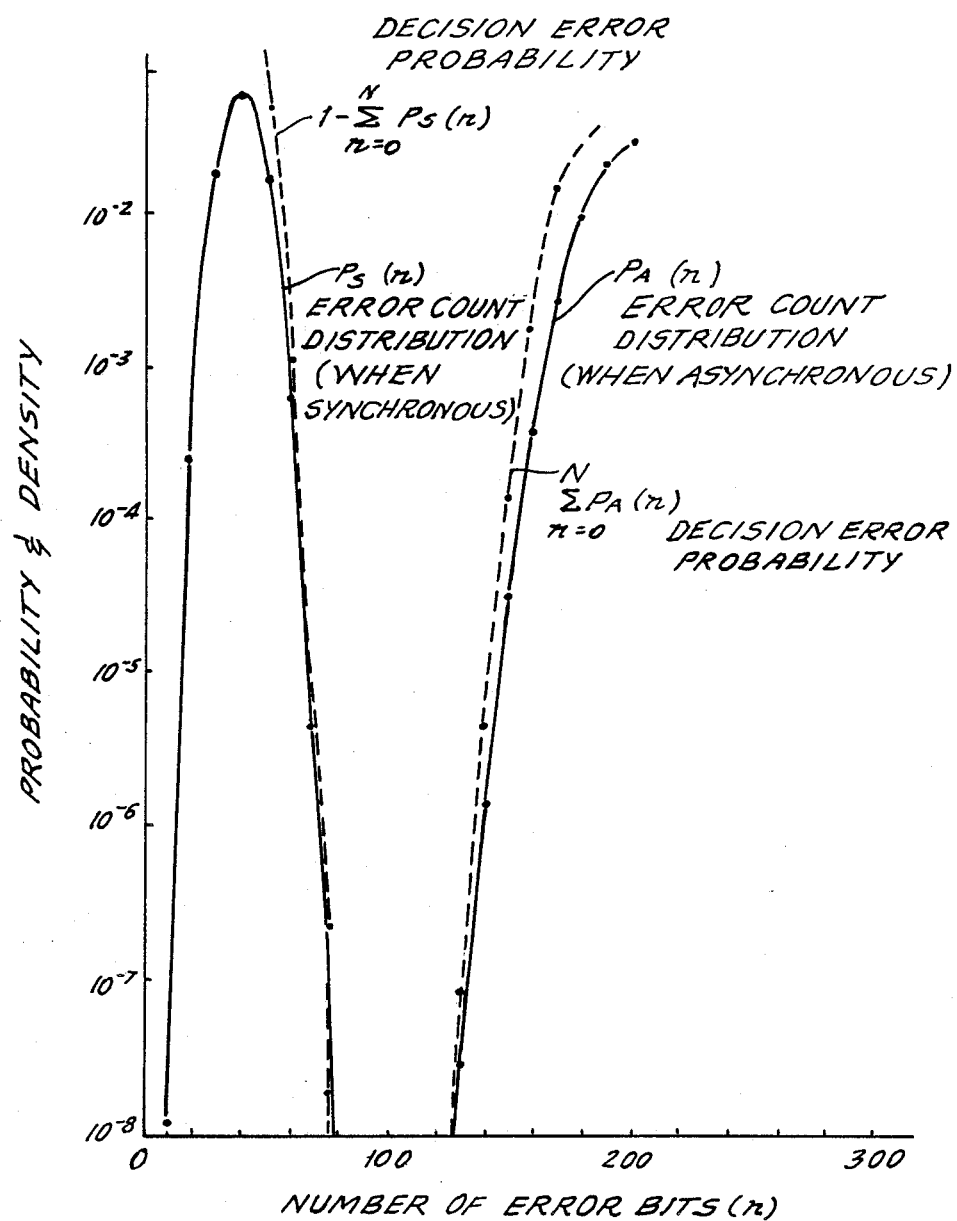

BURST SIGNAL DETECTION APPARATUS

BACKGROUND OF THE INVENTION

The present invention relates to signal detection apparatus for use in a satellite communication system, for example. The invention, more particularly, relates to a burst signal detecting apparatus in which the probability of reception of erroneous data can be controlled to an extremely small value.

The present invention is applicable to made up of a unique word followed by data that is CRC (Cyclic Redundancy Check) coded and error-correcting coded. A prior art signal detection apparatus for detecting this type of burst signal basically comprises an error-correcting decoder, a CRC error detector, a UW detector, and an output circuit for providing a signal indicating the presence or absence of error in the burst signal.

In the foregoing, prior art signal detection apparatus, the UW detector detects a unique word from the burst signal and delivers to the output circuit an arrival signal, which is representative of the arrival of the data. The error-correcting decoder decodes the error-correcting code used with regard to the data in the burst signal, and feeds the decoded data to the CRC error detector. In response, the CRC error detector performs a cyclic check on the decoded data to see if the received data is free from error, delivers the received data as output data to an external circuit, and provides an output decision signal, indicating presence or absence of error, extends to the output circuit. Upon receiving the arrival signal, if the error signal indicates absence of error, the output circuit sends, the output signal to the external circuit indicating that there are no errors in the output data.

A problem with the prior art signal detection apparatus described above is that the probability of reception of incorrect data cannot be easily reduced. This stifles improvements in the reliability of a communication channel, as discussed in detail below.

SUMMARY OF THE INVENTION

A main object of the present invention is to provide a signal detecting apparatus which solves the problem of the prior art apparatus set forth above and allows the probability of reception of erroneous data to become extremely small.

In order to achieve the above object, a burst signal detection apparatus of the present invention includes a unique word (UW) detector means for (a) receiving a burst signal comprising a unique word followed by data that has undergone CRC coding, and error-correcting coding and (b) detecting the unique word from the burst signal. An error-correcting decoder means is included for receiving the burst signal to decode an error-correcting code used with to the data. A cyclic Redundancy Check (CRC) means receives decoded data provided by the error-correcting decoder to detect a CRC error. A channel quality detector means detects quality of the channel which receives the burst signal. An output circuit is included for generating a detection signal in response to outputs of the unique word detector means, CRC error detector means, and the channel quality detector means.

BRIEF DESCRIPTION OF THE DRAWINGS

These objects as well as other objects of this invention shall become readily apparent after reading the following description of the accompanying drawings in which:

FIG. 6 is a plot showing the distribution of the probability and density of transmission channel errors in accordance with the present invention.

DESCRIPTION OF PREFERRED EMBODIMENTS OF THE INVENTION

Figure 1:
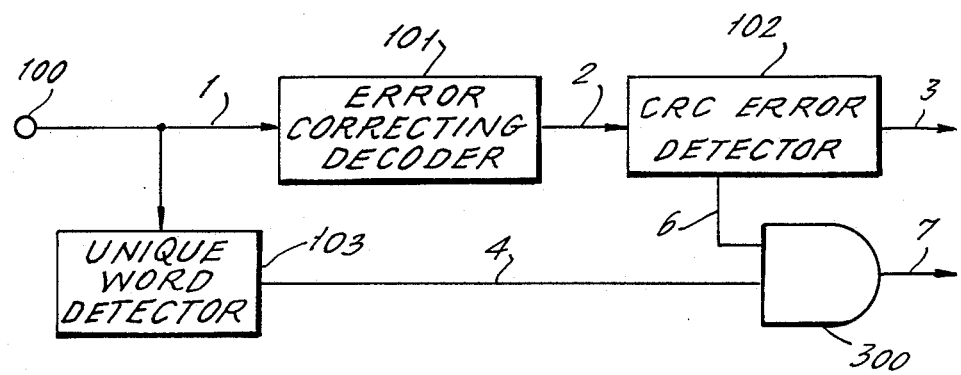
FIG. 1 is a block diagram showing a prior art burst signal detection apparatus.

To better understand the present invention, brief reference is made to a prior art burst signal detection apparatus, shown in FIG. 1. As shown, the prior art apparatus basically comprises an error-correcting decoder 101, a Cyclic Redundancy Check (CRC) error detector 102, a Unique Word (UW) detector 103, and an output circuit (i.e., an AND gate) 300.

Figure 2:
FIG. 2 shows format of a burst signal.

As shown in FIG. 2, a burst signal 1 which is applied to an input terminal 100 (FIG. 1) is made up of data (DATA), and a unique word (UW) which precedes the data to indicate the beginning of the data. The data has undergone CRC coding and error-correcting coding at a transmitting station (not shown). The burst signal 1 is fed to the error-correcting decoder 101 and the UW detector 103.

In response, the UW detector 103 detects the unique word (UW) from the burst signal 1 and delivers to the output circuit 300 an arrival signal 4, which is indicative of the arrival of the data (DATA). As well known in the art, the unique word is implemented with a fixed codeword.

The error-correcting decoder 101 decodes an error-correcting code with regard to the data (DATA) of the burst signal 1, delivering decoded data 2 to the CRC error detector 102.

The CRC error detector 102 performs a cyclic check on the decoded data 2 to see if the received data is free from error, feeds the received data as output data 3 to an external circuit (not shown), and applies to the output circuit 300 a decision signal 6 representing a result of decision.

Consequently, when the arrival signal 4 is received, if the content of the decision signal 6 indicating lock of error, the output circuit 300 sends an output signal 7 to an external circuit indicating that there are no errors in the output data 3.

However, in the prior art system described so far, which decides that error-free correct data has been received based on the detection of a unique word and a decision signal 6 indicating lock of error, it is difficult to reduce the probability of reception of erroneous data and, therefore, to enhance the reliability of a communication channel.

In particular, since such an error correction technique applies to data but not to a unique word, the detection of a unique word suffers from a substantial error rate, resulting in non-detection and erroneous detection. Generally, the probability of non-detection Pm and the probability of erroneous detection Pf are expressed as:

$$Pm = \sum_{i=\epsilon+1}^{N} {}_NC_i P_e^i (1 - P_e)^{N-i} \quad (1)$$

$$Pf = \sum_{i=0}^{\epsilon} {}_NC_i (\tfrac{1}{2})^N \quad (2)$$

where N is the length of a unique word, $\epsilon$ is the tolerable number of error bits, and Pe is the bit error rate.

Figure 3:
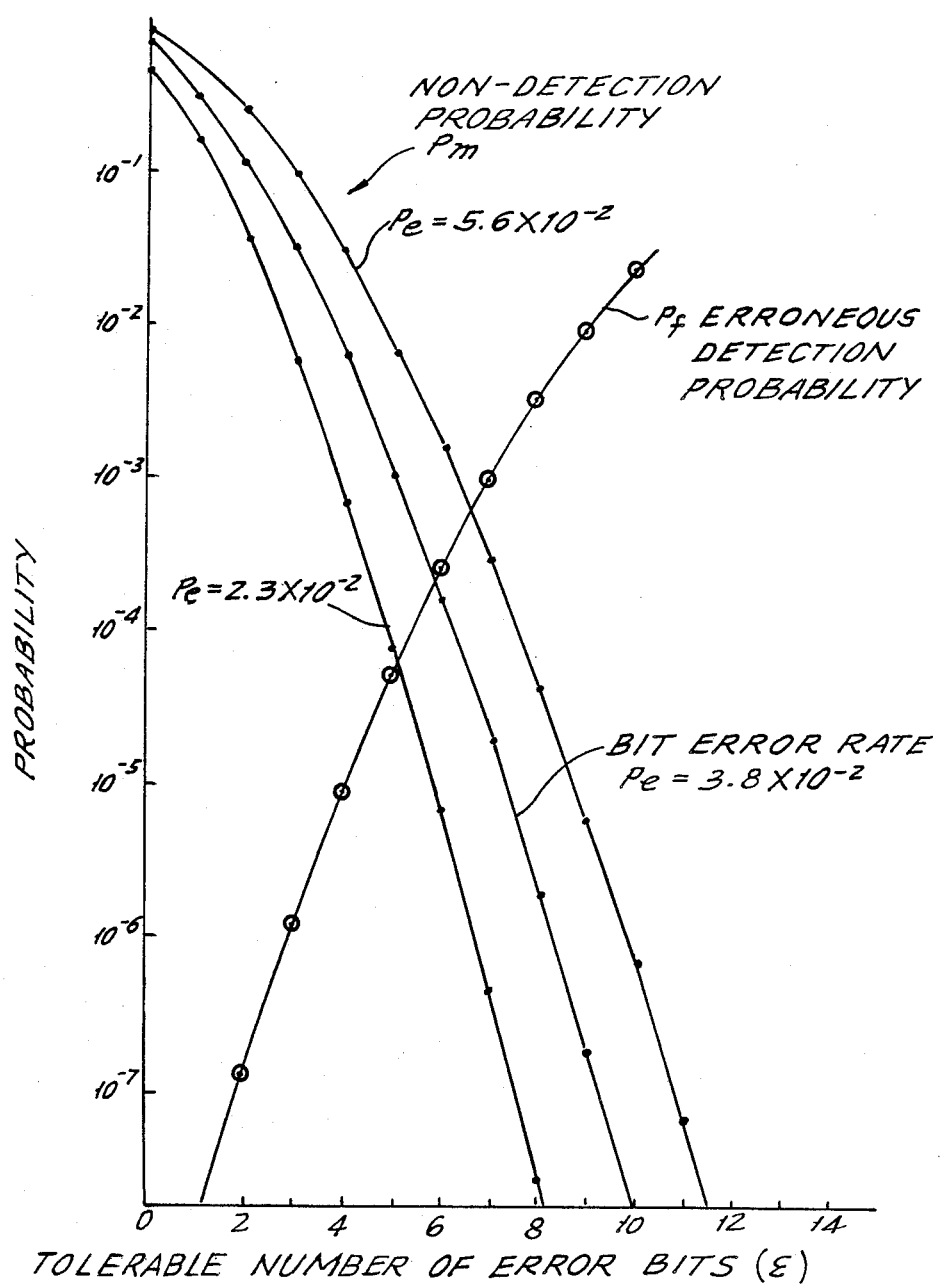
FIG. 3 is a plot showing distributions of the probability of non-detection and of erroneous detection of a unique word.

Although the non-detection probability Pm and the erroneous detection probability Pf may be reduced if the length N of a unique word is made longer, such would reduce the ratio of data length to unique word length and, thereby, the transmission efficiency. For this reason, difficulty is experienced in reducing the probabilities Pm and Pf. Further, in case a data transmission system for satellite communication is implemented with a random access system which allows a signal to be transmitted at any desired time, e.g., a slotted ALOHA system, the arrival of a signal cannot be predicted and, hence, signal detection has to be continuously performed. In such case, the frequency of error detection per unit time is as great as $Pf \cdot f_s$ times, where $f_s$ is the signalling rate. For reference, exemplary numerical values of Pm and Pf for N=32 are shown in FIG. 3.

In CRC error detection, the detecting ability is generally determined by a relationship between the degree of a generator polynomial and the number of error bits. For satellite communication, a highly efficient error correction system is adopted to meet the demand for effective use of satellite power and, therefore, the error rate of decoded data of an error-correcting code is quite low. However, once erroneous detection of a unique word occurs, i.e., once a random signal is input to an error-correcting decoder, the output signal also becomes a random signal. A CRC error detector determines such a random signal sometimes correctly, and sometimes incorrectly. Specifically, assuming a sixteenth-degree polynomial as prescribed by CCITT Recommendation X.25, 2.2.7 and often applied to CRC error detection, although not greater than sixteen bits of errors may be detected without fail, seventeen or more bits of errors are sometimes detected and sometimes not. Should data be decided error-free despite the presence of errors, a terminal to handle data would interpret it as correct data, sometimes resulting in a critical fault. Since the probability that data with seventeen or more bits of errors is decided error-free is $178^{16} - 1.5 \times 10^{\times 5}$ (see Inose et al. "DATA COMMUNICATIONS" Sanpo, pp. 87 to 91), assuming that the transmission rate is 56 kbps (kilobits per second) and the probability of erroneous detection Pf is $2.6 - 10^4$ (corresponding to $\epsilon = 6$ as shown in FIG. 3), the frequency of data slipping is $2.6 \times 10^{-4} \; 56 \times 10^3 \times 1.5 \times 10^{-5} = 2.1 \times 10^{-4}$ times per second. This implies that erroneous data is received substantially once per hour, aggravating the reliability of a communication channel.

Figure 4:
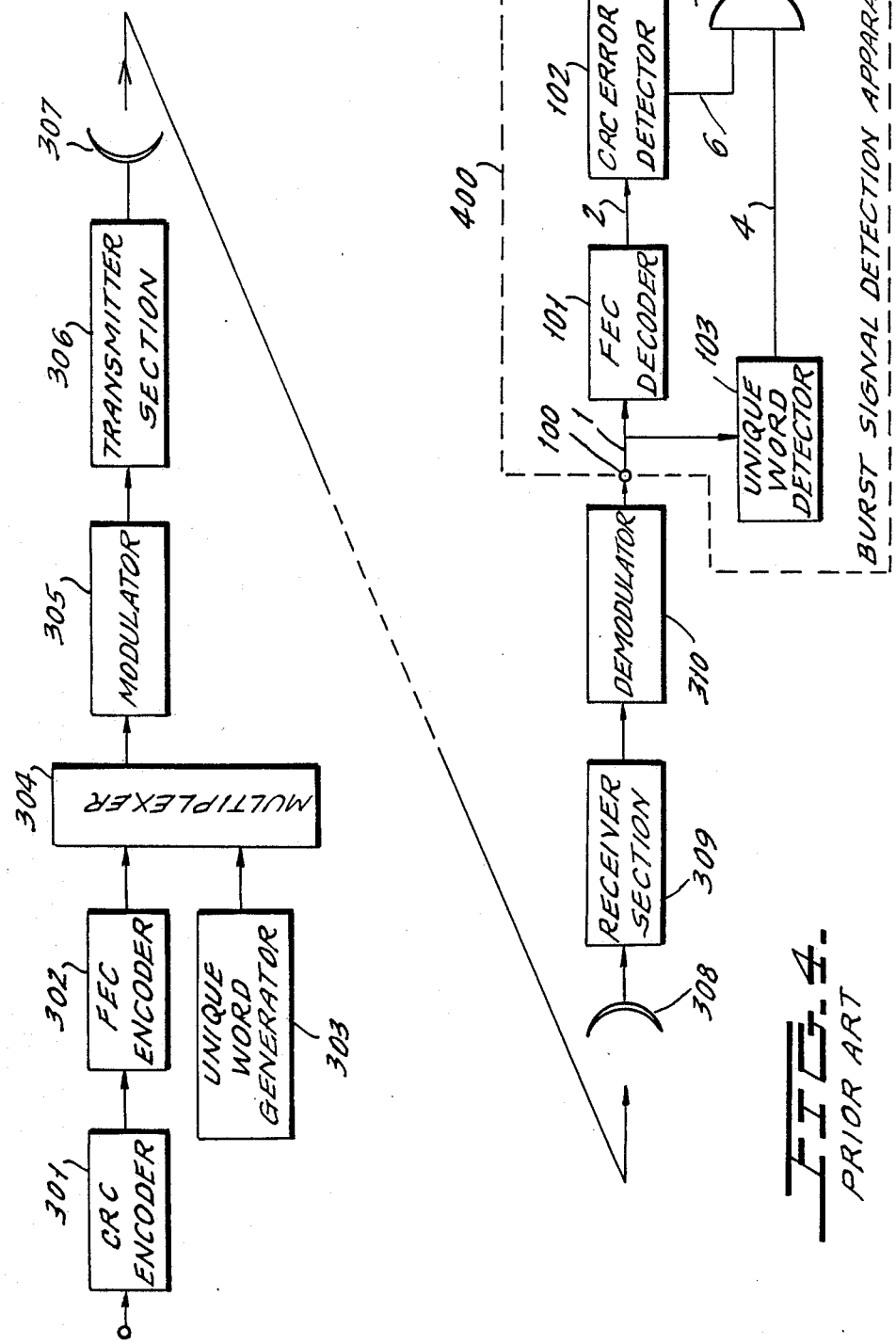
FIG. 4 is a block diagram showing a burst signal communication system to which the burst signal detection apparatus of FIG. 1 is applied.

FIG. 4 shows a schematic block diagram of a burst signal communication system which uses the prior art burst signal detection apparatus of FIG. 1. As shown, a block of burst data is subjected to cyclic-check coding by a CRC encoder 301 and, then, to error-correction coding by an FEC (Forward Error Correction) encoder 302 which is one of error-correcting encoders known in the art, and the resultant error-correction coded data is fed to a multiplexer 304. The multiplexer 304 combines a unique word fed to it from a UW generator 303 and the error-correction coded data, and provides a burst signal formatted as shown in FIG. 2. The resulting burst signal is digitally modulated by a modulator 305 and, then, transmitted via a transmitter section 306 and an antenna 307. A digitally modulated burst signal is received up by a antenna 308 and routed through a receiver section 309 to a demodulator 310 to be demodulated to a burst signal. This burst signal is detected by a burst signal detection apparatus 400 in the manner described above with reference to FIG. 1.

For details of an FEC encoder and an FEC decoder, reference may be made to "SCPC/QPSK AND SCPC/PCM/QPSK SYSTEM SPECIFICATION" INTELSAT EARTH STATION STANDARDS (IESS) Document IESS-303, pp. 1 to 61, especially FIGS. 6, published Jul. 1, 1985. As regards the CRC encoder 301, see POLYNOMIAL GENERATOR (MC8506) available from Motorola.

A burst signal detection apparatus in accordance with the present invention is designed to solve the error rate problem of the prior art discussed above. In overview, the apparatus of the invention is capable of reducing the probability of reception of incorrect data to a significant extent by assessing the quality of a communication channel along with necessary conditions of signal detection.

Figure 5:
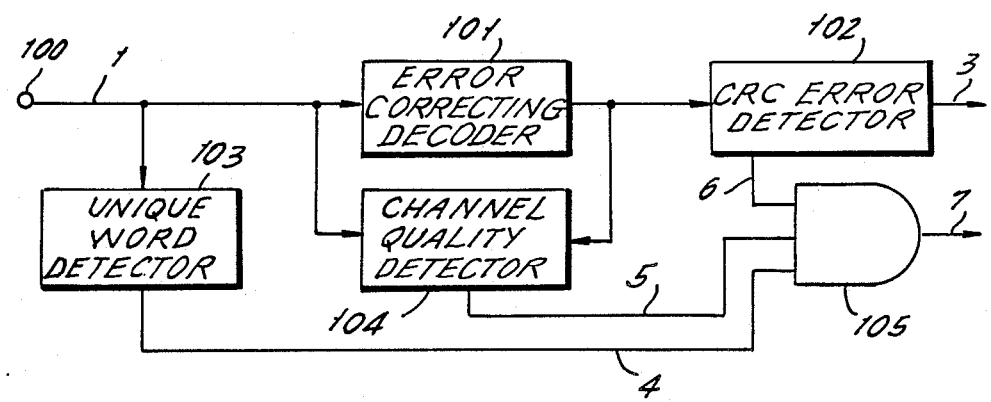
FIG. 5 is a block diagram showing a burst signal detection apparatus embodying the present invention.

Referring to FIG. 5, a burst signal detection apparatus in accordance with the present invention is shown. In FIG. 5, the same or similar structural parts and elements as those of the prior art apparatus described above are designated by like reference numerals, and detailed description of such parts and elements are omitted.

In the embodiment shown in FIG. 5, a channel quality detector 104 is provided in parallel with an error-correcting decoder 101. The output, or detect signal, 5 of the channel quality detector 104 is fed to an output circuit 105 together with an arrival signal 4 and a decision signal 6. The channel quality detector 104 recodes an output of the error-correcting decoder 101, i.e., decoded data 2, and compares it with the input to the error correcting decoder 101, i.e., data contained in a burst signal 1, to estimate channel error. When the estimated channel error is less than a threshold, known as a count number, the channel quality detector 104 produces the detect signal 5.

Assume that the period of time necessary for the channel quality detector 104 to determine bit errors, i.e., a unit number of bits to be decided, is $10^3$ bits, and that the error rate of input code to the error-correcting decoder 101 is $3.8 \times 10^{-2}$ (under synchronous condition: SYNC) or $2 \times 10^{-1}$ (under a synchronous condition: ASYNC). Then, the error count distribution $P_A(n)$ under the a synchronous condition is produced by:

$$P_A(n) = \frac{200^n}{n!} e^{-200} \quad (3)$$

and the error count distribution $P_S(n)$ under the synchronous condition is produced by:

$$P_S(n) = \frac{40^n}{n!} e^{-40} \quad (4)$$

where n is the number of error bits as counted during the decision time ($10^3$ bits).

FIG. 6 is a plot showing exemplary numerical values produced by changing the number of error bits n of the equations (3) and (4) and decision error probability $$1 - \sum_{n=0}^{N} P_S(n) \text{ and } \sum_{n=0}^{N} P_A(n) \quad (n = 0 \text{ to } 300).$$

It is to be noted that N in $$1 - \sum_{n=0}^{N} P_S(n) \text{ and } \sum_{n=0}^{N} P_A(n)$$

is the decision threshold value.

In FIG. 6, the ordinate is representative of the probability that an error bit is decided correctly. Although the probability less than 10-8 is not shown, it will be seen assuming that the decision threshold N is 100, (i.e., that the number of error bits n is 100), the probability that an error bit is decided correctly after the erroneous detection of a unique word is less than $10^{-9}$.

It follows that assuming that the time when all of the conditions (1) detection of a unique word, (2) channel error being less than the decision threshold N (assuming that N is 100, the decision error probability is $10^{-9}$), and (3) no CRC error being present (as regards the previously mentioned exemplary values, the frequency of data slipping is $2.1 \times 10^{-4}$) are met is the signal detection reference, the frequency of data slipping per unit time is $$2.1 \times 10^{-4} \times 10^{-9} = 2.1 \times 10^{-13} \text{ times per second}$$
$$\approx \text{once per } 10^5 \text{ years}$$

Such a frequency is fully negligible.

Figure 7:
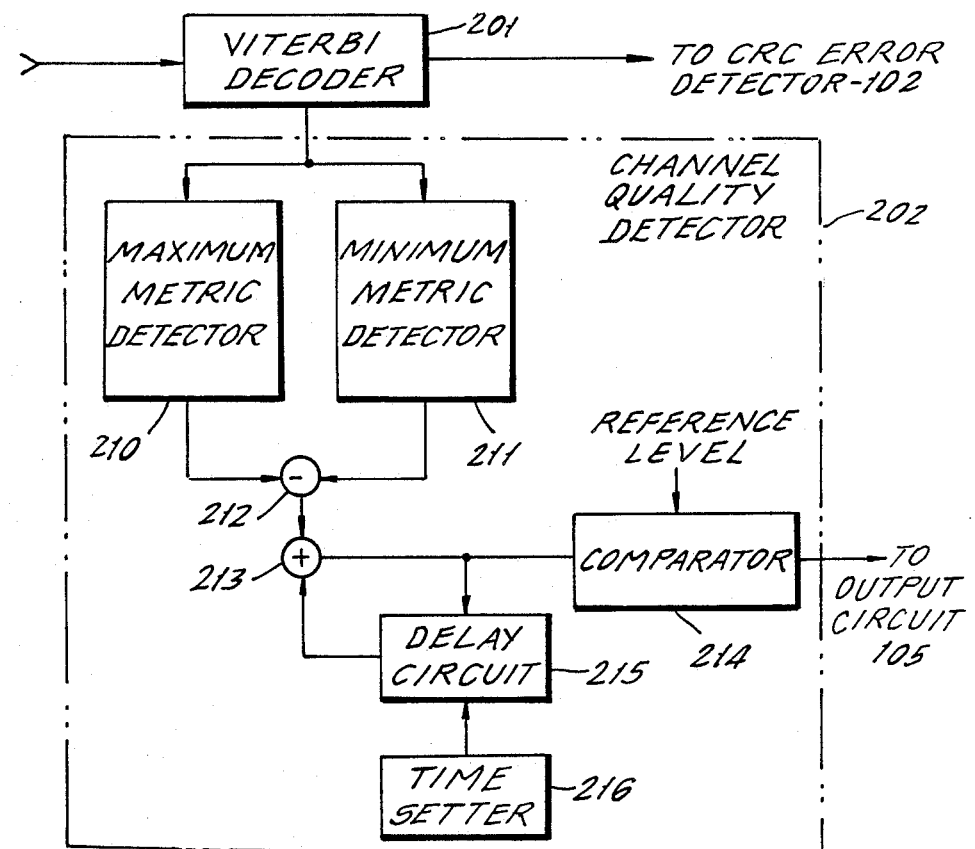
FIG. 7 is a block diagram showing an essential part of another embodiment of the present invention.

Referring to FIG. 7, another embodiment of the present invention is shown in which the error-correcting decoder 101 of the first embodiment is replaced with a Viterbi decoder 201, which is a maximum likelihood decoder. A channel quality detector 202 is constructed to estimate channel quality by using metrics defined in the Viterbi decoder 201. As regards the Viterbi decoder, reference may be made to U.S. Pat. No. 3,789,360, issued Jan. 29, 1974 and to U.S. Pat. No. 4,536,878, issued Aug. 20, 1985.

The Viterbi decoder 201 has metrics each corresponding to a respective one of different states (e.g. sixty-four states for a constraint length of 7) which are produced by integrating branch metrics which are in turn obtained from the burst signal 1 (FIG. 5). The following approach is preferred for estimating channel quality by synchronization decision based on the metrics, although various other approaches may be used.

The channel quality detector 202 basically comprises a maximum metric detector 210, a minimum metric detector 211, a subtractor 212, an adder 213, a comparator 214, a delay circuit 215, and a time setter 216. The maximum metric detector 210 and the minimum metric detector 211 detect, respectively, the maximum one and the minimum one of the metrics of all the states in the Viterbi decoder 201. The minimum and maximum metrics are then fed to the subtractor 212. In response, the subtractor 212 determines the difference between the maximum and minimum metrics and delivers the difference to the adder. 213. The time setter 216 sets an integration time of, for example, 1 second in the closed loop which extends from the adder 213 to the adder 213 via the delay circuit 215, and applies the integration time to the delay circuit 215. The delay circuit 215 may be implemented with a 1-bit delay element, by way of example. A result of integration in the closed loop is fed to the comparator 214. Then, the comparator 214 compares the result of integration with a predetermined threshold and, if the result is greater than the threshold, the comparator determines that synchronization is established and, if not, determines that synchronization is not established. A result of such a decision is representative of channel quality and is the previously stated detection signal 5.

In summary, it will be seen that the present invention provides a burst signal detection apparatus in which channel quality is considered in addition to necessary conditions for signal detection, so that, even if an UW detector erroneously detects a unique word or if a CRC error detector decides that, data is correct despite the presence of errors, a signal detector is prevented from delivering a no-error signal as long as the channel quality is below a predetermined level. Hence, the probability that noise and other erroneous data are mistakenly handled as correct data is significantly reduced, whereby a communication channel may be provided with considerable degree of reliability.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A burst signal detection apparatus, comprising:
   a unique word detector means for receiving a burst signal of the type comprising a unique word followed by data that has undergone a cyclic redundancy check coding and error-correction coding and for detecting the unique word from the burst signal;
   an error-correcting decoder means for decoding an error-correction code used with the data;
   a cyclic redundancy check detector means for receiving decoded data from the error-correcting decoder for detecting any cyclic redundance check error;
   a channel quality detector means for detecting quality of the channel on which the burst signal is received; and
   an output circuit for providing an output signal indicating presence or absence of error in the data in response to outputs of the unique word detector means, the cyclic redundancy check detector means, and the channel quality means;
   the output circuit comprising an AND gate with inputs from the word detector means, the cyclic redundancy check error detector means, and the channel quality detector means.

2. A burst signal detection apparatus as claimed in claim 1, wherein the channel quality detector means includes means to compare input and output signals to the error-correcting decoder means for assessing channel quality.

3. A burst signal detection apparatus as claimed in claim 1, wherein the channel quality detector means includes means for sensing a decoding condition in the error-correcting decoder means in order to assess channel quality.

* * * * *